United States Patent [19]

Ota et al.

[11] Patent Number: 5,343,545

[45] Date of Patent: Aug. 30, 1994

[54] INTERCONNECTABLE MULTI-TERMINAL STAR COUPLER

[75] Inventors: Takeshi Ota, Kanagawa; Mitsuzo Arii, Tokyo; Masukazu Hirata, Tokyo; Yasunari Kawabata, Tokyo, all of Japan

[73] Assignees: Fuji Xerox Co., Ltd.; Mitsubishi Gas Chemical Company, Inc., both of Tokyo, Japan

[21] Appl. No.: 90,955

[22] Filed: Jul. 13, 1993

[30] Foreign Application Priority Data

Jul. 14, 1992 [JP] Japan .................................. 4-187065

[51] Int. Cl.$^5$ ............................................. G02B 6/26
[52] U.S. Cl. .......................................... 385/46; 385/14
[58] Field of Search .................. 385/14, 15, 16, 17, 385/20, 21, 22, 23, 24, 46

[56] References Cited

U.S. PATENT DOCUMENTS

| | | | |
|---|---|---|---|
| 3,883,222 | 5/1975 | Gunderson | 350/96 C |
| 4,948,218 | 8/1990 | Kobayashi | 385/24 |
| 5,109,444 | 4/1992 | Honda et al. | 385/14 |

FOREIGN PATENT DOCUMENTS

| | | | |
|---|---|---|---|
| 0310184 | 4/1989 | European Pat. Off. | 385/14 |
| 0408261 | 1/1991 | European Pat. Off. | |
| 3601729 | 7/1987 | Fed. Rep. of Germany | |
| 61-86710 | 5/1986 | Japan | 385/46 |
| 63-291014 | 11/1988 | Japan | |
| 44-0418 | 10/1990 | Japan | 385/14 |
| 4-301607 | 10/1992 | Japan | 385/14 |
| 2227854 | 8/1990 | United Kingdom | |

OTHER PUBLICATIONS

Ota, "Coupled Star Network: A New Configuration for Optical Local Area Network", IEICE Trans. Commun., vol. E75-B, No. 2, Feb. 1992, pp. 67–75.

Ota, "Four-port Multimode Interconnectable Star Coupler," Electronics Letters, vol. 29, No. 10, May 13, 1993, pp. 919–920.

Kurokawa et al., "Fiber optic sheet formation by selective photopolymerization," Applied Optics, vol. 17, No. 4, Feb. 15, 1978, pp. 646–650.

Okuda et al., "Planar gradient-index glass waveguide and its applications to a 4-port branched circuit and star coupler," Applied Optics, vol. 23, No. 11, Jun. 1, 1984, pp. 1745–1748.

Ota, "Interconnectable Star Coupler" proceeding of 1991 Spring meeting of the Institute of Electronics, Information and Communication Engineers of Japan, B910, pp. 4–72, 1991.

Ota, "Coupled Star Network," proceeding of 1992 Spring meeting of the Institute of Electronics, Information and Communication Engineers of Japan, B1020, 1990, pp. 4–172.

*Primary Examiner*—Rodney B. Bovernick
*Assistant Examiner*—John Ngo
*Attorney, Agent, or Firm*—Finnegan, Henderson, Farabow, Garrett & Dunner

[57] ABSTRACT

A multi-terminal star coupler having a circuit constituted by optical waveguides integrated on a substrate. For example, in a four-terminal star coupler, four uniformly three-dividing optical couplers are provided for branching from any one terminal to the other three terminals, and an optical waveguide from any one terminal to another terminal not adjacent to the one terminal includes an intersection portion where the optical waveguide intersects another optical waveguide lead from another terminal adjacent to the one terminal.

7 Claims, 4 Drawing Sheets

INTERCONNECTABLE MULTI-TERMINAL STAR COUPLER

BACKGROUND OF THE INVENTION

The present invention relates to a star coupler used in an optical Local Area Network (LAN) or the like, and particularly to a star coupler which can be interconnected.

There have been proposed star couplers interconnectable in use (for example, refer to Ota: "Interconnectable Star Couplers", proceeding of 1991 Spring Meeting of The Institute of Electronics, Information and Communication Engineers of Japan, B910 (1991)). There has been further proposed an optical communication network constituted by interconnectable star couplers connected through an optical amplifier (for example, refer to Takeshi Ota: "Coupled Star Network: A New Configuration for Optical Local Area Network", IEICE Trans. Commun. Vol. E75-B, No. 2, pp. 67-75 (1992)). There has been furthermore proposed an interconnectable star coupler having input and output terminals integrated into one (for example, refer to Ota: "Coupled Star Network", proceeding of 1992 Spring Meeting of The Institute of Electronics, Information and Communication Engineers of Japan, B1020 (1992) and Ota: "Four-port Multimode Interconnectable Star Coupler", Electronics Lett., Vol. 29, No. 10, pp. 919-920 (1993)). FIG. 7 shows an example of a conventional interconnectable star coupler having input and output terminals integrated into one.

In the conventional four-terminal interconnectable star coupler shown in FIG. 7, two optical fibers 2 are coupled on each of the two opposite end surfaces of a rectangular substrate 1, and respective terminals Ta, Tb, Tc and Td are coupled through optical waveguides 5, one-to-two asymmetric optical couplers 6, and symmetric optical couplers 7.

An optical signal S inputted from one terminal Ta of the four-terminal star coupler shown in FIG. 7 is branched into two waveguides at the ratio of 2:1 through the asymmetric optical coupler 6. The optical signal passed through one of the two waveguides (on the smaller branching ratio side) is outputted as it is to the opposite terminal Tb. On the other hand, the optical signal passed through the other waveguide (on the larger branching ratio side) is further branched through the symmetric optical coupler 7 and outputted to the other two terminals Tc and Td. Since the respective terminals Ta, Tb, Tc and Td of the star coupler in FIG. 7 are symmetrical, an optical signal inputted into any one terminal is not distributed to the one terminal but is uniformly distributed to terminals other than the one terminal. That is, an interconnectable star coupler is realized.

In the four-terminal star coupler shown in FIG. 7, however, light passes two curved lines (utilizing circular arcs here) that sandwich a straight line therebetween in the optical coupler 7, so that the light is apt to leak in the portion where the light is incident from the straight line to the curved lines to increase a data loss (refer to FIGS. 8(a) and 8(b)). Further, such a loss also is produced in the optical coupler 6.

Generally, light propagated in an optical waveguide leaks in accordance with the degrees of change of the curvature of the line when the curvature changes. Particularly in the case where a linear waveguide 9 is connected to a curved waveguide 8 as shown in FIG. 8(a), two bendings are produced so that leakage is caused in each of the two bendings. Other than this, if two curved lines 8 and 8 different in polarity of curvature, that is, having positive and negative curvatures respectively, are continuously connected as shown in FIG. 8(b) (two bendings are produced also in this case), leakage is produced in the portion where light is incident from one curved line 8 to the other curved line 8.

This fact corresponds to the fact that the difference between the number of modes propagatable in a linear optical waveguide and the number of modes propagatable in a curved optical waveguide becomes a loss in the case of a multi-mode optical waveguide. Light can be guided in a mode propagatable in a curved optical waveguide as long as the curvature of the optical waveguide does not change. Accordingly, such a loss depends on the change of curvature and the number of times of change, and does not depend on the length of the optical waveguide as long as the curvature does not change.

Also in such a conventional six-terminal star coupler as shown in FIG. 9, losses are produced in bent portions of optical couplers 6 and 7. The example shown in FIG. 9 has a structure such that in a certain path, a terminal is connected to another terminal through not less than two bendings, so that the losses caused by the bendings becomes larger.

SUMMARY OF THE INVENTION

It is therefore an object of the present invention to provide an interconnectable multi-terminal star coupler in which the change of curvature and the number of times of the changes are made as small as possible to thereby reduce losses caused by the bendings.

In order to attain the foregoing object, the present invention provides an interconnectable multi-terminal star coupler including: a substrate; terminals, the number N of which is not smaller than four, provided on the substrate; and a circuit, connected to the terminals, including optical waveguides and N optical couplers for one-to-(N-1) branching from any one of the terminals to the others of the terminals on the substrate, each optical waveguide from any one of the terminals to another of the terminals which is not adjacent to the one terminal including an intersection portion where the each optical waveguide intersects at least one waveguide from others of the terminals.

DETAILED DESCRIPTION OF THE PREFERRED EMBODIMENTS

An embodiment will be described with reference to the drawings to explain the features of the present invention.

Figure 1:
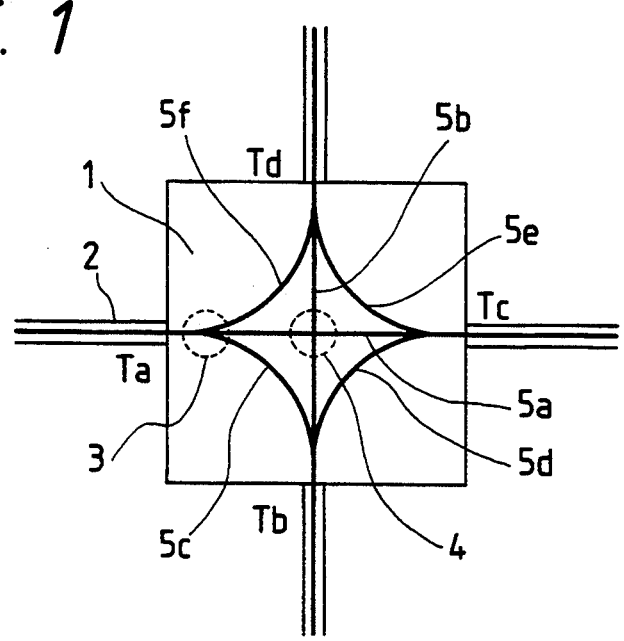
FIG. 1 is a plan view illustrating an embodiment of an interconnectable four-terminal star coupler according to the present invention.

FIG. 1 is a plan view illustrating an embodiment of the interconnectable four-terminal star coupler according to the present invention. Two optical waveguides 5a and 5b intersecting perpendicularly to each other are formed on a substrate 1 having a rectangular shape, and the end portions of the respective optical waveguides 5a and 5b are led out to the four end surfaces of the substrate 1 to form terminals Ta, Tb, Tc and Td. Optical fibers 2 are coupled with the respective terminals Ta, Tb, Tc and Td. Further, terminals adjacent to each other are coupled with each other through optical waveguides 5c, 5d, 5e and 5f formed on the substrate 1 and curved at an angle of 90° so that those waveguides 5c, 5d, 5e and 5f include 1×3 symmetric optical coupler 3 in cooperation with the optical waveguides 5a and 5b in the vicinity of the terminals Ta, Tb, Tc and Td, respectively. Each optical waveguide is formed, for example, by a core layer and a clad layer covering this core layer so that light travels in the optical waveguide while being reflected on a reflection surface formed in the interface between the core layer and the clad layer.

Figure 2:
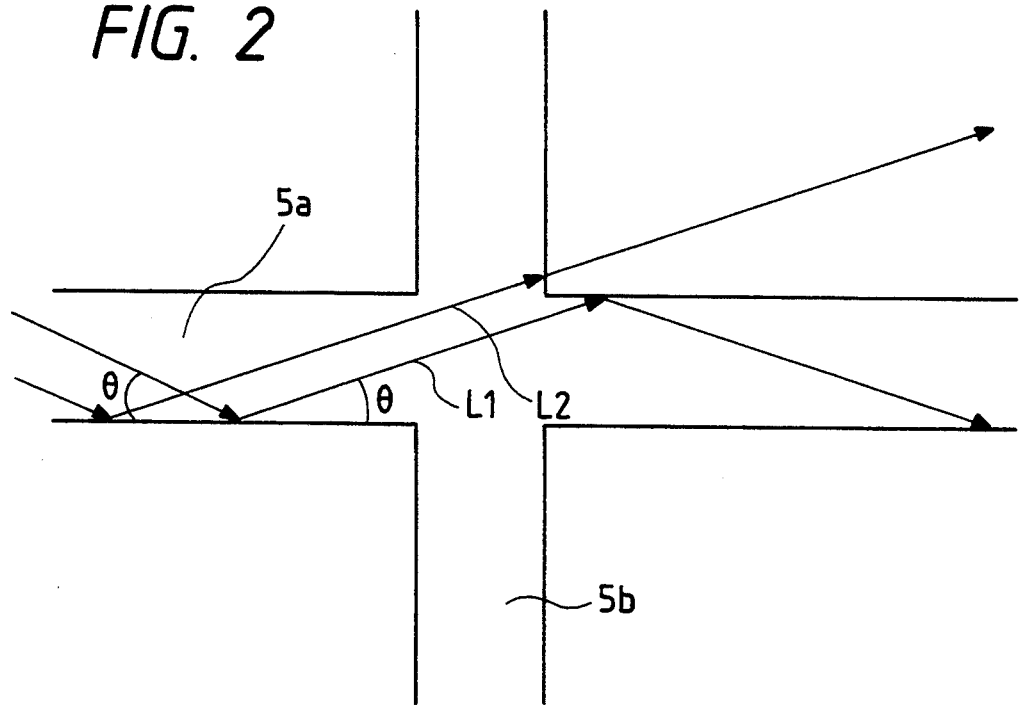
FIG. 2 is a typical diagram illustrating, on an enlarged scale, an intersection portion of the four-terminal star coupler shown in FIG. 1.

FIG. 2 is an explanatory diagram illustrating, on an enlarged scale, an intersection portion 4 of the optical waveguides 5a and 5b. Now assume that light is supplied into the optical waveguide 5a through the terminal Ta. In the optical waveguide 5a, light propagates while being totally reflected on the interface of the optical waveguide 5a. If the incident angle 8 of the light to the interface is large, the light passes through the interface, and therefore only the light L1 incident to the interface at a very small angle travels in the optical waveguide 5a. Assuming that light designated by reference character L2 is inputted into the optical waveguide 5b which is perpendicular to the optical waveguide 5a, the light L2 is incident to the interface of the optical waveguide 5b at such a large angle that total reflection is not produced, and the light L2 passes through the interface of the optical waveguide 5b. There is therefore no leakage of light from the optical waveguide 5a to the optical waveguide 5b. That is, the optical waveguides 5a and 5b can be regarded as optically independent, though they are coupled in structure.

Figure 7:
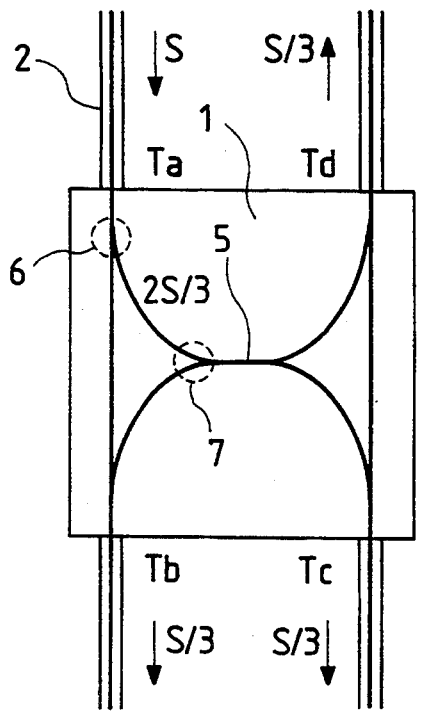
FIG. 7 is a plan view illustrating a conventional interconnectable four-terminal star coupler.
Figure 9:
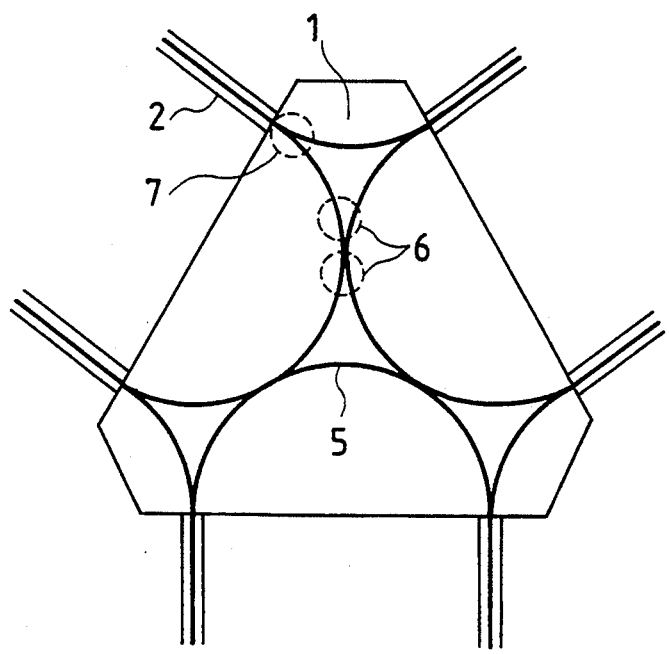
FIG. 9 is a plan view illustrating a conventional interconnectable six-terminal star coupler.
Figure 8A:
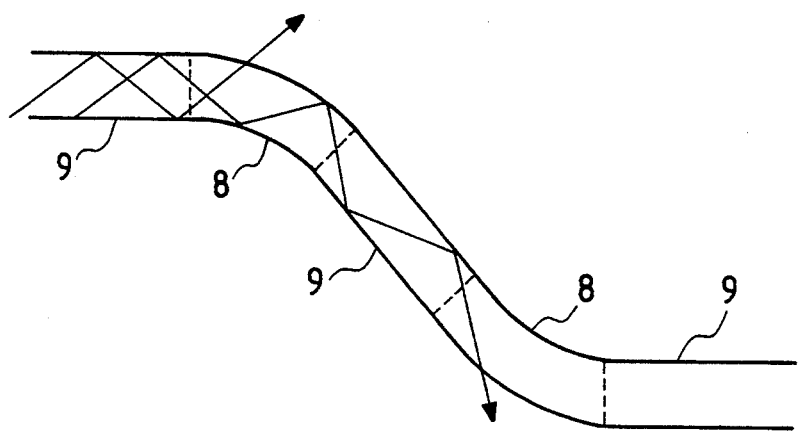
FIGS. 8(a) and 8(b) are schematic diagrams illustrating the leakage of light caused by bending of an optical waveguide.
Figure 8B:
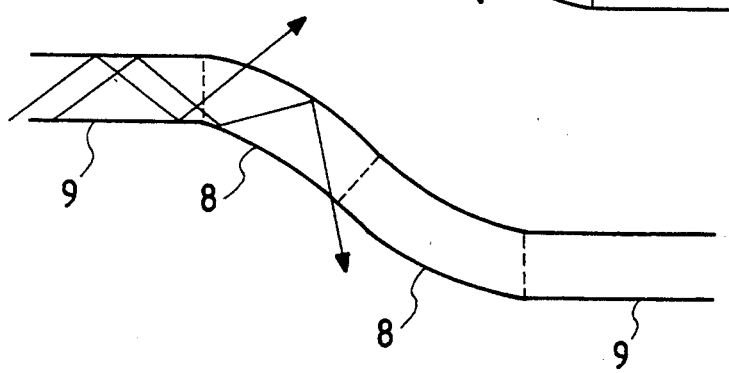

Now assume that light is supplied through the terminal Ta, and this light is divided uniformly into three by the optical coupler 3, and light divided uniformly is outputted to each of the terminals Tb, Tc and Td. Since the respective terminals Ta, Tb, Tc and Td are symmetrical, an optical signal inputted to any one terminal is not distributed to the one terminal, but distributed uniformly to terminals other than the one terminal. That is, it is possible to realize the same function of the conventional star coupler shown in FIG. 7.

The state of bending of an optical waveguide will be considered. In the star coupler of this embodiment shown in FIG. 1, the number of bendings from a straight portion to a curved portion is a maximum of, and the number of bendings is reduced in comparison with the number of bendings, (i.e. two bendings) of the prior art shown in FIG. 7. That is, it is possible to reduce the loss due to bendings while realizing the same star coupler function as in the prior art.

Although the two optical waveguides intersect perpendicularly to each other in the embodiment shown in FIG. 1, it is not always necessary for them to intersect perpendicularly to each other. The range of possible values of the intersecting angle of the optical waveguides will be discussed below.

Figure 3A:
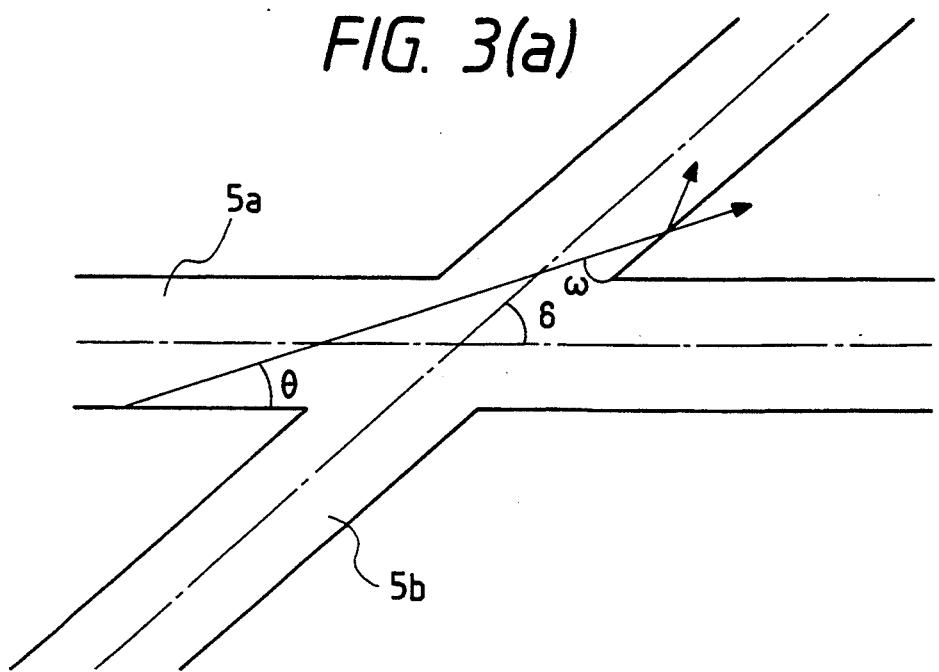
FIGS. 3(a) and 3(b) are typical diagrams for explaining the range of possible intersection angles in an intersection portion.
Figure 3B:
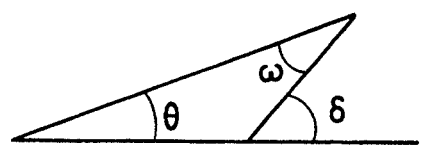

Now, as shown in FIG. 3(a), assume that the intersection angle of the optical waveguides 5a and 5b is δ, the critical angle to the interface of the optical waveguide 5a is Θ, and the angle of light to the interface of the optical waveguide 5b is ω. Then, the relation $$\delta = \Theta + \omega$$

is established as shown in FIG. 3(b). Therefore, the following equation is obtained.

$$\omega = \delta - \Theta$$

Total reflection is produced on the interface of the optical waveguide 5a but not produced on the interface of the optical waveguide 5b under the following condition:

$$\omega > \Theta$$

Therefore, light can be prevented from leaking between optical guides which intersect each other if the following condition is satisfied:

$$\delta > 2\Theta$$

Figure 4:
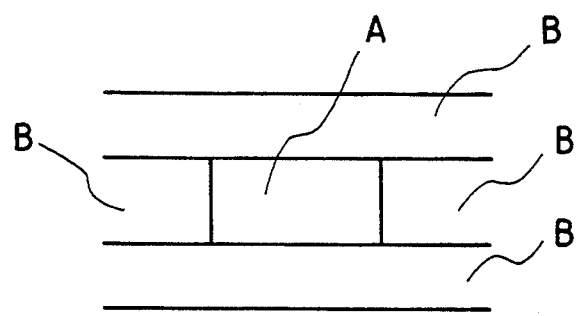
FIG. 4 is a typical diagram illustrating a sectional structure of an optical waveguide.

For example, assume that an optical waveguide is formed by a core layer A and a clad layer B covering the core layer A as shown in FIG. 4, the refractive index of the core layer A is $n_1$, the refractive index of the clad layer B is $n_2$ ($n_1 > n_2$), and the maximum possible angle to the interface, that is, the critical angle of light traveling in the optical waveguide is Θ. Then, the critical angle is expressed as follows.

$$\Theta = 90 - \sin^{-1}(n_2/n_1)$$

Generally $n_2/n_1$ is about 0.98, and therefore Θ is 2.8°. Therefore, it will go well in principle if the intersection angle δ of the two optical waveguides is larger than about 5.6°. When the intersection angle 8 is small, the opening area of one optical waveguide viewed from the other optical waveguide through which light is passing becomes so large as to increase the quantity of light traveling to the one optical waveguide and jumping out of the one optical waveguide so that the quantity of reduction of light is increased. Accordingly, it is desirable that the intersection angle 6 is selected to be approximately 90°.

Figure 5:
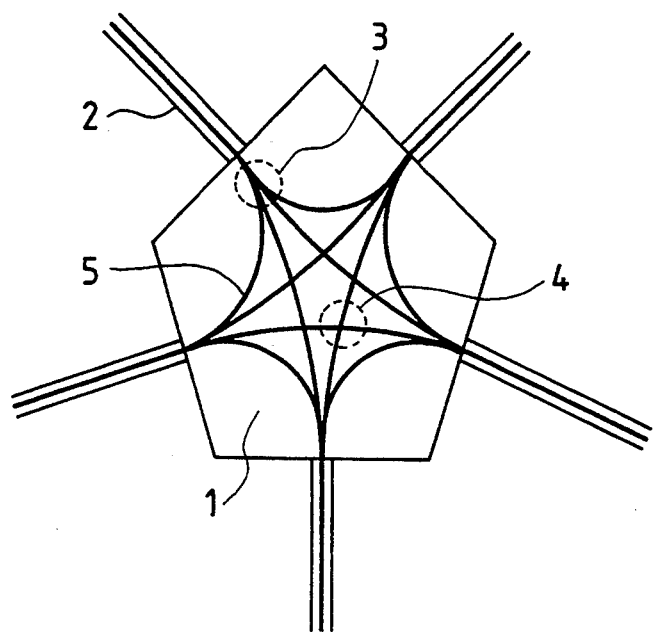
FIG. 5 is a plan view illustrating an embodiment of an interconnectable five-terminal star coupler according to the present invention.

FIG. 5 shows an embodiment of a five-terminal star coupler according to the present invention. A plurality of optical waveguides 5 for connecting any one of the terminals to all the other terminals are formed on a substrate 1 having a pentagonal shape. Light supplied to any one of the terminals is distributed into the optical waveguides through a 1×4 optical coupler 3 for uniform luminous intensity distribution so that the light is supplied to all the other terminals. Also in this embodiment shown in FIG. 5, optical waveguides for connecting any one of the terminals to other two other terminals which are not adjacent to the one terminal intersect other optical waveguides for connecting a next one terminal to two other terminals which are not adjacent to this next one terminal intersect to form intersection portions 4. There is no leakage in each of the intersection portions 4 if the optical waveguides intersect each other at an angle not smaller than the predetermined angle value which was described above. Also in this embodiment shown in FIG. 5, each optical waveguide has only one bending, and therefore the loss caused by bending can be reduced.

Figure 6:
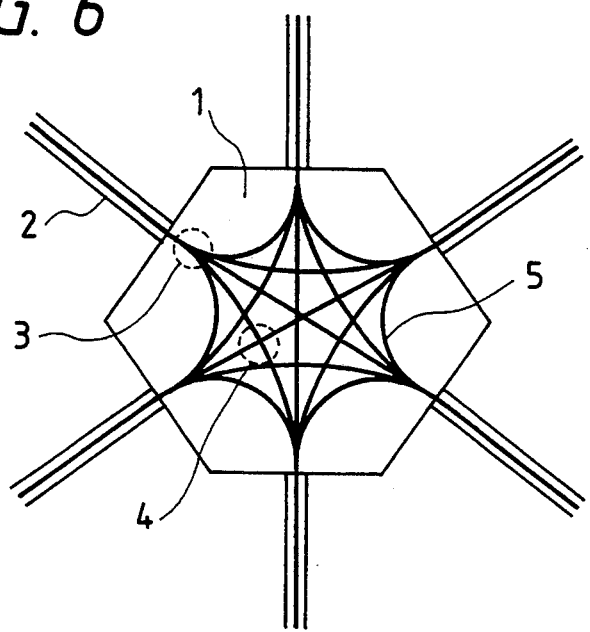
FIG. 6 is a plan view illustrating an embodiment of an interconnectable six-terminal star coupler according to the present invention.

FIG. 6 shows an embodiment of a six-terminal star coupler according to the present invention. On a substrate 1 having a hexagonal shape, any one terminal is connected to all the other terminals through optical waveguides 5 by means of a 1×5 optical coupler 3 for uniform luminous intensity distribution, and there are intersection portions 4 where optical waveguides 5 intersect each other. Also in this embodiment shown in FIG. 6, each optical waveguide has only one bending so that the loss caused by bending can be reduced.

An N-terminal star coupler shown in the above-mentioned embodiments can be formed by selective photopolymerization of polycarbonate and methyl acrylate, for example, as described in T. Kurokawa, N. Takato, S. Okikawa, and T. Okada: "Fiber optic sheet formation by selective photopolymerization", Appl. Opt. 17, p646 (1978). In this case, a multi-mode one optical waveguide is formed.

The present invention is not to be limited to the above producing method, but may be produced by use of a known method for forming an optical waveguide by dispersing metal ions such as thallium or the like on a glass substrate (for example, refer to E. Okuda, I. Tanaka, and T. Yamasaki: "Planar gradient-index glass waveguide and its applications to a 4-port branched circuit and star coupler", Appl. Opt. 23, p1745 (1984)).

Further, the number of terminals of a star coupler is not limited to six or less, but can be expanded if necessary.

The "intersection portion" in the present invention means a portion in which a plurality of optical waveguides intersect each other at a predetermined angle on one and the same plane.

According to the present invention, an optical circuit is formed by optical waveguides which are made to intersect each other. It is therefore possible to reduce the number of bendings of the optical waveguides in an interconnectable star coupler so that it is possible to reduce the loss of the optical waveguides.

What is claimed is:

1. An interconnectable multi-terminal star coupler comprising:
   a substrate;
   terminals, the number N of which is not smaller than four, provided on said substrate; and
   a circuit, connected to said terminals, including optical waveguides and N couplers for one-to-(N-1) branching from any one of said terminals to the others of said terminals on said substrate, each optical waveguide from any one of said terminals to another of said terminals which is not adjacent to said one terminal including an intersection portion where said each optical waveguide intersects at least one waveguide from others of said terminals.

2. The star coupler according to claim 1, wherein the two optical waveguides are intersected at a predetermined intersection angle in the intersection portion.

3. The star coupler according to claim 2, wherein the predetermined intersection angle is approximately larger than 5.6°.

4. The star coupler according to claim 3, wherein the predetermined intersection angle is approximately 90°.

5. The star coupler according to claim 1, wherein the number N of said terminals is four and said substrate has a rectangular shape.

6. The star coupler according to claim 1, wherein the number N of said terminals is five and said substrate has a pentagonal shape.

7. The star coupler according to claim 1, wherein the number N of said terminals is six and said substrate has a hexagonal shape.

* * * * *